United States Patent
Batistic

(10) Patent No.: US 6,205,393 B1
(45) Date of Patent: Mar. 20, 2001

(54) METHOD OF IMPROVING THE CONTROL BEHAVIOR OF AN ANTILOCKING SYSTEM

(75) Inventor: Ivica Batistic, Frankfurt am Main (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/077,651

(22) Filed: Sep. 8, 1998

(30) Foreign Application Priority Data

Dec. 2, 1995 (DE) .............................................. 195 45 012

(51) Int. Cl.[7] .............................. G06F 7/00; G06F 17/00
(52) U.S. Cl. .............................. 701/71; 701/70; 701/78; 701/79; 701/83; 303/155
(58) Field of Search .................................. 701/69, 70, 71, 701/78, 79, 83, 110; 303/149, 155

(56) References Cited

U.S. PATENT DOCUMENTS

| | | | |
|---|---|---|---|
| 4,693,522 | * | 9/1987 | Wupper et al. . |
| 4,729,608 | * | 3/1988 | Fennel et al. . |
| 5,207,484 | * | 5/1993 | Bleckmann et al. . |
| 5,272,636 | * | 12/1993 | Buschmann et al. . |

FOREIGN PATENT DOCUMENTS

| | | |
|---|---|---|
| 3426665 | 2/1985 | (DE) . |
| 3717531 | 12/1987 | (DE) . |
| 4016661 | 11/1990 | (DE) . |
| 3935559 | 5/1992 | (DE) . |
| 4234819 | 4/1993 | (DE) . |
| 4300048 | 10/1994 | (DE) . |
| 4317050 | 11/1994 | (DE) . |
| 0442500 | 8/1991 | (EP) . |
| 0488405 | 6/1992 | (EP) . |
| WO91/15386 | 10/1991 | (WO) . |

OTHER PUBLICATIONS

English translation of the International Preliminary Examination Report for PCT/EP96/04530.

* cited by examiner

Primary Examiner—William A. Cuchlinski, Jr.
Assistant Examiner—Gertrude Arthur
(74) Attorney, Agent, or Firm—Rader, Fishman & Grauer PLLC

(57) ABSTRACT

To improve the control behavior of an ABS, a driving situation on a low coefficient of friction is quickly and reliably identified. To this end, the reacceleration of the non-driven wheels following a control-induced braking pressure reduction is analyzed, and the existence of a low coefficient of friction is identified if simultaneously in the reacceleration phase the maximum reacceleration of the two non-driven wheels is below a predefined limit value and the maximum filtered acceleration is below a specific predefined limit value, and if the duration of the positive variation of the filtered acceleration in this phase exceeds a predetermined time limit value. When these conditions are satisfied, braking pressure reduction in the following instability phase of the wheels is increased, for example, by a permanent actuation of the pressure reducing valves.

5 Claims, 3 Drawing Sheets

Fig. 3
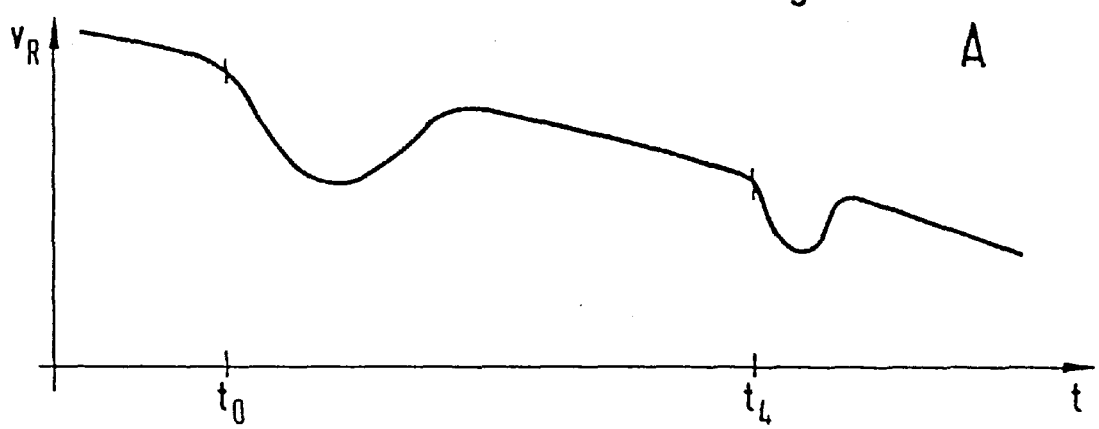
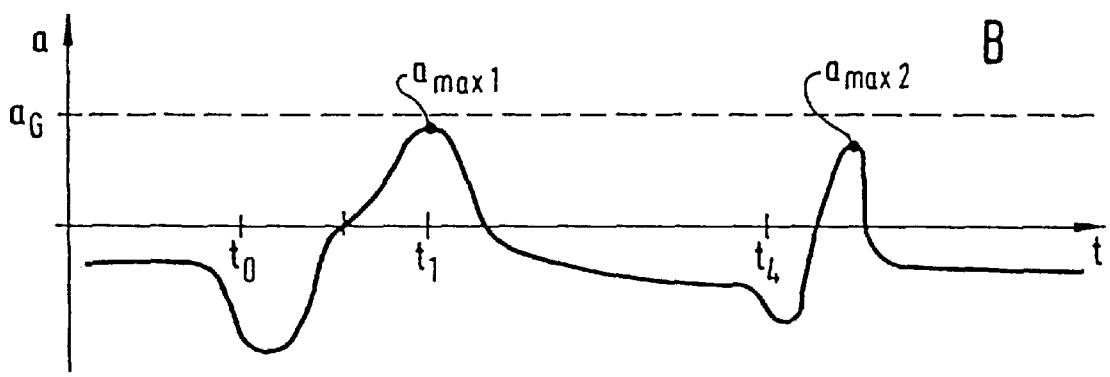
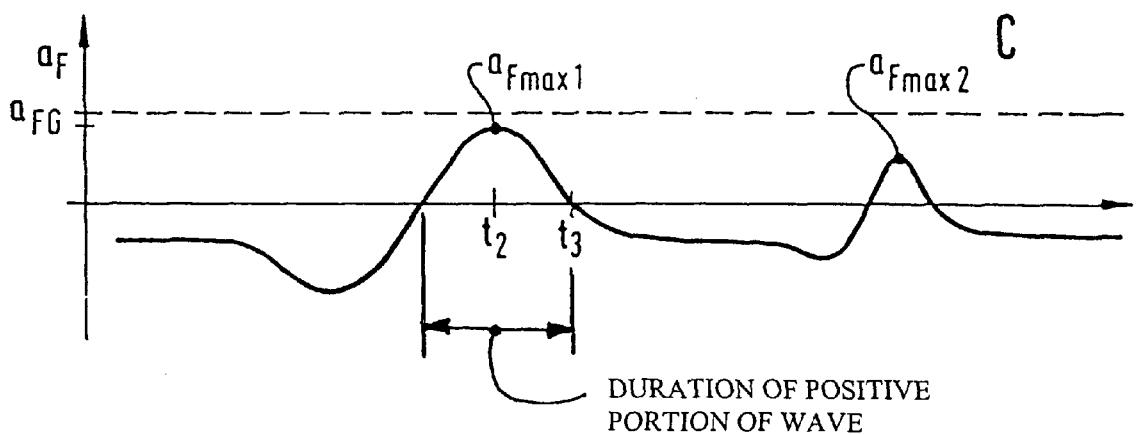
DURATION OF POSITIVE PORTION OF WAVE
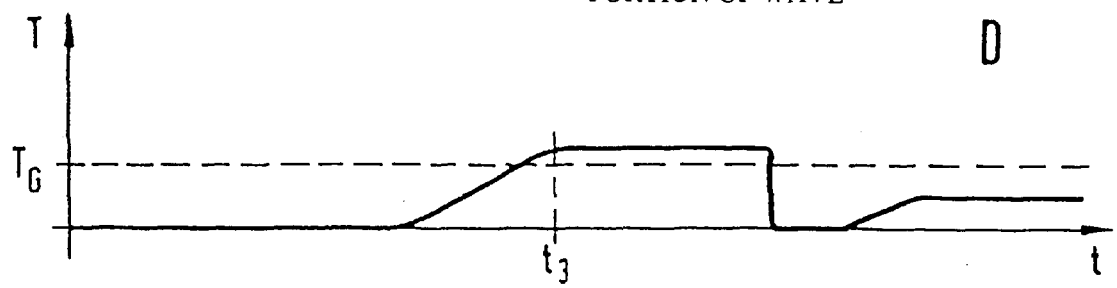

METHOD OF IMPROVING THE CONTROL BEHAVIOR OF AN ANTILOCKING SYSTEM

TECHNICAL FIELD

The present invention relates to vehicle braking systems and more particularly relates to a method of improving the control behavior of an anti-lock brake system (ABS).

BACKGROUND OF THE INVENTION

Electronically controlled anti-lock systems are commonly included in the standard equipment of medium-class and upper-class automotive vehicles. In the majority of cases, the most important input and control signals of the anti-lock system are produced by means of wheel sensors which sense the rotational behavior of the individual vehicle wheels and send the data to the electronic unit for evaluation. In the so-called controller which includes the electronic unit, braking pressure control signals are calculated which are transmitted to actuators for the modulation of the braking pressure or for braking pressure control. The actuators are typically electrically controllable hydraulic valves.

Identifying the desired control response from the data provided by the wheel sensors and the consistent controlling of the braking pressure for anti-lock control is known to be difficult when the interpretation of the rotational behavior of the wheels does not permit a definite indication of the instantaneous road conditions and the vehicle behavior.

The instantaneous friction value or coefficient of friction between the vehicle tires and the road is an important factor for anti-lock control. This quantity is approximately determined by the electronic unit by measuring and logically combining the rotational behavior of the individual wheels according to predetermined criteria and algorithms. Data which characterizes the coefficient of friction can be produced, for example, by way of the accumulated pressure reduction time during a control phase or instability of a wheel. In specific situations, i.e., in the event of a small difference between drive torque and brake torque (due to cautiously braking on slippery road surfaces, etc.), however, slowly changing wheel courses may occur which involve the risk of a so-called 'sneak-away' condition, meaning that all identification criteria for wheel instability are circumvented because a threshold is not reached. The evaluating logic might be 'misled' in such situations. Therefore, the behavior of the wheels must be analyzed according to different principles and criteria in order to preclude misbehavior of the ABS control during these "special situations".

An object of the present invention is to provide a method which permits a quick and reliable assessment of the instantaneous friction value or coefficient of friction between the wheel and the road surface in an electronic anti-lock system of this type. More particularly, the objective is to identify or confirm situations with a low coefficient of friction.

The present invention achieves this object by identifying a control operation on a low friction value or checking a low coefficient-of-friction driving situation determined by the electronic unit and also the reacceleration of the non-driven wheels following a control-induced braking pressure reduction on these wheels. Further, it is evaluated as a special driving situation on a low coefficient of friction between the wheel and the road surface if concurrently, in the reacceleration phase, the maximum reacceleration of the two analyzed wheels is below a specific predefined limit value and the maximum filtered acceleration of these wheels is below another specific, equally predefined limit value, and if the duration of the positive variation of the filtered acceleration in this phase exceeds a predetermined interval, and that in this low coefficient-of-friction situation the braking pressure reduction on these wheels is increased in the following instability phase. This increase can be achieved appropriately by an unpulsed pressure reduction (this is a conventional method), provided the control system includes a pulsed actuation of the pressure reducing valves.

The disclosed method uses the pressure reduction so that the non-driven wheels accelerate in an almost unimpeded or unbraked manner and, thus, are in a position to provide reliable information about the actual vehicle speed. This prevents a 'sneak-away' condition which would have as a result an incorrect vehicle reference speed, which is, as is known, the reference speed produced by logically combining the individual wheel speed signals.

In case the subsequent reacceleration of the wheel is in excess of the value which is plausible for the low coefficient of friction, the assumption or logical conclusion that this is a situation with a low coefficient of friction is revised, and the wheel pressure on the analyzed (non-driven) wheel when wheel lock occurs is reduced in a pulsed manner as usual.

In a preferred embodiment of the present invention, the limit value of the maximum acceleration is predefined in the order of between 2.5 and 4 g, for example, is set to a value of 3 g approximately. A value ranging between 1.2 and 2.5 g, especially between 1.5 and 1.8 g, may be favorable as the limit value of the filtered maximum acceleration. An interval between 50 milli-sec and 100 milli-sec, in particular an interval of roughly 80 milli-sec, is appropriate as a critical duration of the positive variation of the filtered acceleration, at the exceeding of which a low coefficient-of-friction condition is identified.

Further advantages, features and possible applications of the present invention can be seen in the following description of an embodiment, making reference to the accompanying drawings.

BRIEF DESCRIPTION OF THE DRAWINGS

FIG. 3 is a diagram showing the speed variation of a wheel, the associated acceleration and filtered acceleration and the time recording when the method of the present invention is employed.

DETAILED DESCRIPTION OF THE PREFERRED EMBODIMENT

Figure 1:
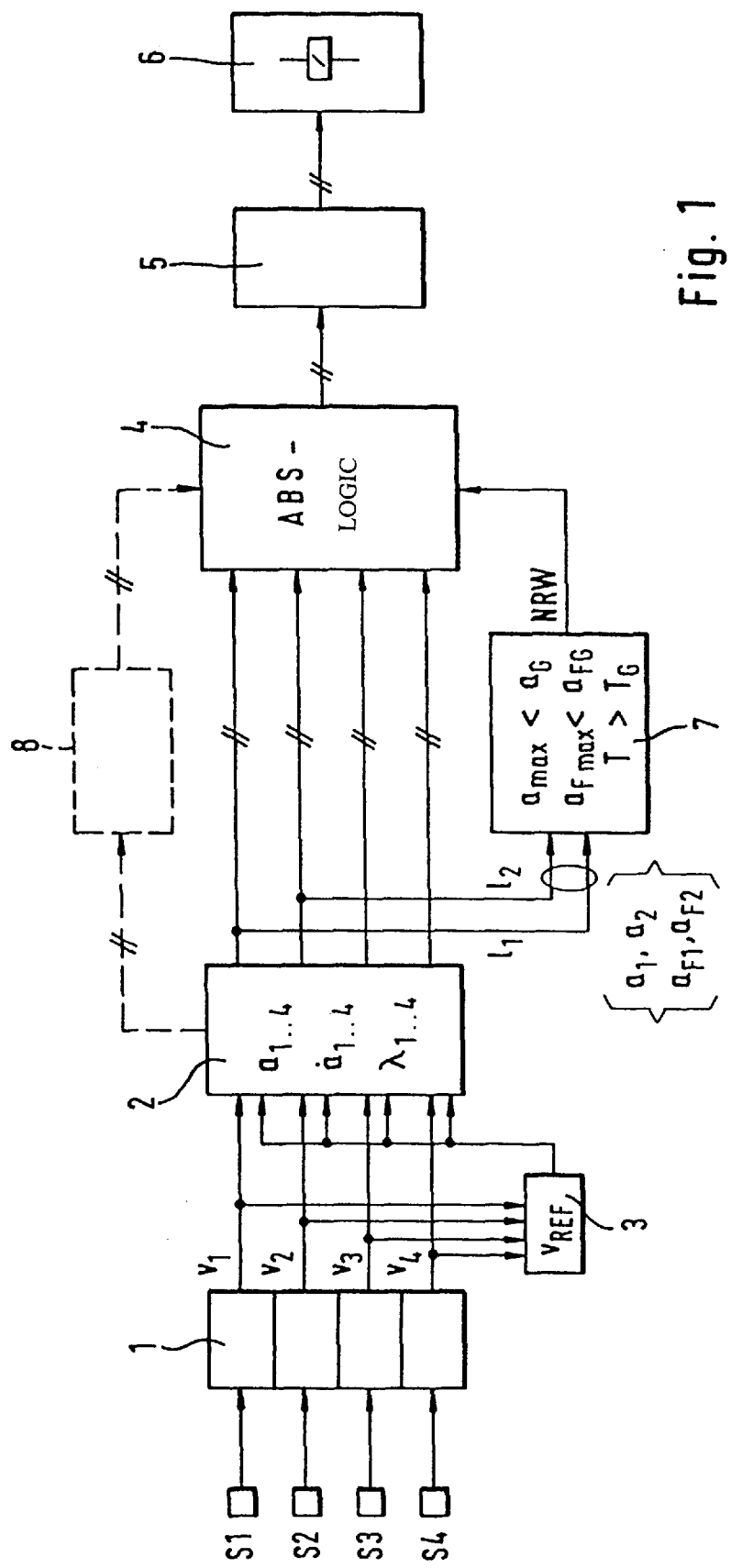
FIG. 1 is a schematically simplified block diagram view of the most important components of a circuit for implementing the method of the present invention.

An electronic circuit for processing the input signals of an anti-lock system and for generating braking pressure control signals is shown in the embodiment of FIG. 1. The input signals of the control system are produced by wheel sensors S1 to S4. Signals or data, representative of the speeds $v_1$ to $v_4$ of the individual vehicle wheels, are derived in a conditioning circuit 1 from the data supplied by the sensors. Among others, the deceleration and acceleration $a_1$–$a_4$ of the individual wheels, the time variations of these quantities ($a_1$–$a_4$), and the wheel slip $\lambda_1$ to $\lambda_4$ is calculated from these speed signals or data in an evaluating circuit 2. As a reference quantity for this slip calculation, a vehicle reference speed $v_{REF}$ corresponding approximately to the vehicle speed is required. The vehicle reference speed is determined in a circuit 3 by logically combining the individual wheel speed signals $v_1$ to $v_4$. Depending on the configuration of the electronic control unit, still further signals responsive to the rotational behavior of the individual wheels, for example, peak values, average values, etc., may be derived in the evaluating circuit 2.

In a circuit 4 which is represented as an ABS logic unit and comprises comprehensive hard-wired or programmed circuits, braking pressure control signals are produced on the basis of predetermined control algorithms. The braking pressure control signals are sent by way of a valve actuation control 5 to a circuit block 6 which includes braking pressure actuators, for example, electromagnetically controllable hydraulic valves. The ABS logic unit 4 preferably comprises one or more complete microcomputers or microcontrollers for processing the input data and for implementing monitoring functions.

The valve block 6 may comprise, for example, electrically controllable inlet and outlet valves, assigned to the individual controlled wheels, which permit adjusting the braking pressure in the individual wheel brakes to the calculated value.

To implement the method of the present invention, the circuit of FIG. 1 includes an additional circuit 7 which is, according to the present invention, taken into account for the analysis of the reacceleration or the reacceleration behavior of the non-driven vehicle wheels, i.e., wheels 1 and 2 in this case. Therefore, the deceleration and acceleration signals $a_1$, $a_2$ which are produced by the evaluating circuit 2 and include the required input data for the additional circuit 7 are sent to the additional circuit 7 by way of connecting lines $1_1$, $1_2$. The deceleration or acceleration signals $a_1 \ldots a_4$ are known to represent the first time derivative of the wheel speed $v_1 \ldots v_4$. The filtered speed signals $a_{F3}$, $a_{F4}$ are produced in the evaluating circuit 2 or (exactly as in the illustration chosen herein) in the additional circuit 7. The duration $T_F$ of the positive variation of the filtered acceleration $a_{F1}$, $a_{F2}$ which is additionally required for the method of the present invention is also determined in the additional circuit 7.

Further, another additional circuit 8 is shown FIG. 1 in dotted lines. Circuit 8 represents circuits and/or program blocks by which further ABS functions and methods of evaluation of the input information are realized. It is suitable to evaluate, monitor and secure the data produced by analysis of the wheel sensor signals according to different criteria in order to record greatly distinguishing situations to which the control must be react in an appropriate manner. The data processing in the ABS logic unit 4 is adapted to the findings gained by the circuit 8 or the special conditions by means of the signals produced in the additional circuit.

Figure 2:
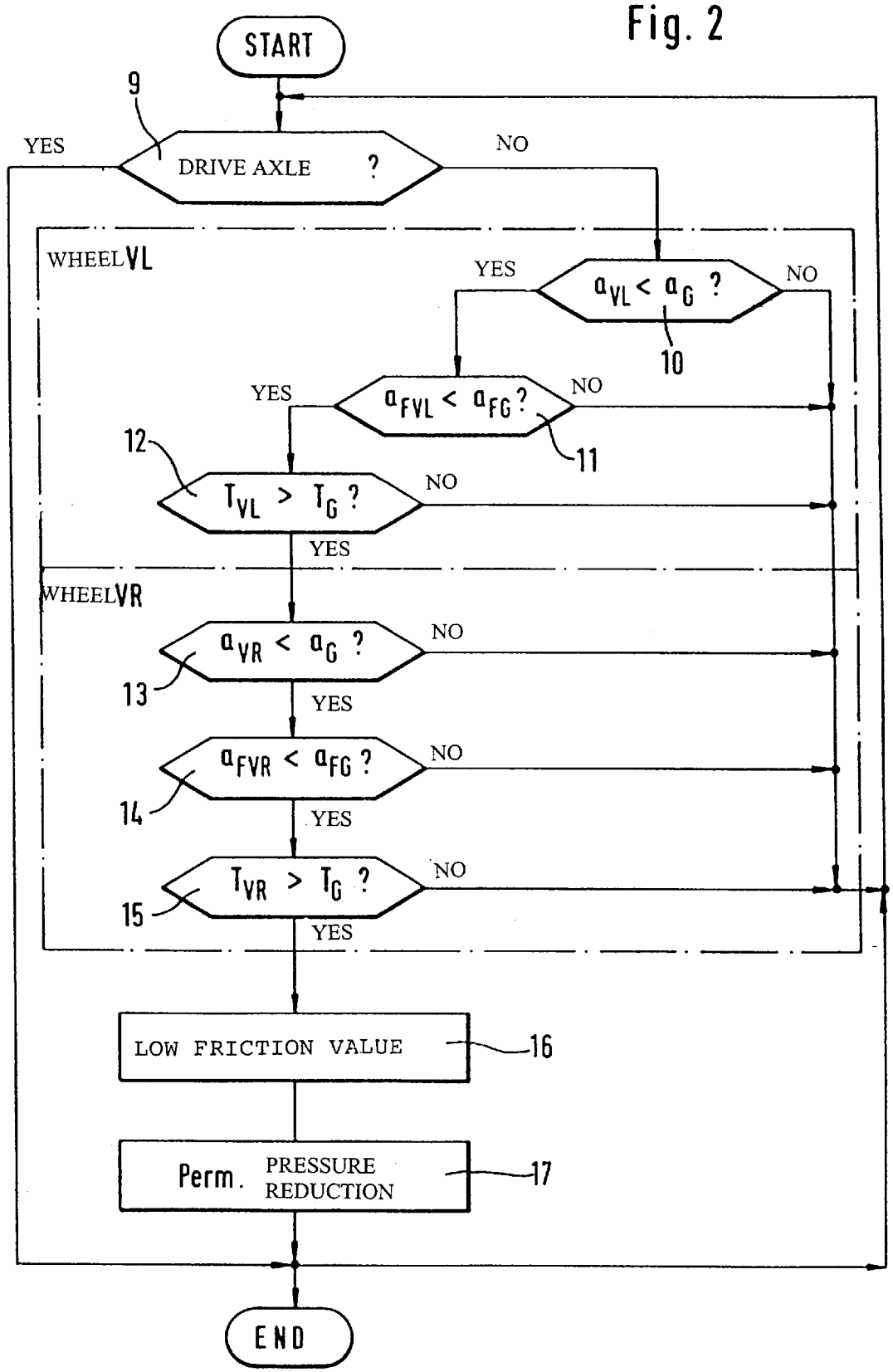
FIG. 2 is a flow chart showing the course of the individual steps of decision in the method of the present invention.

The mode of operation of the additional circuit 7 necessary for the operation of the present invention is shown in the flow chart of the FIG. 2 embodiment. The following operation is performed by programming or logical combining by way of the additional circuit 7. After the START of this special function, initially, the acceleration signals which emanate from the non-driven wheels are determined in block 9. This selection is made by the exclusive linking of the additional circuit 7 to the non-driven vehicle wheels by way of lines $1_1$, $1_2$ in the embodiment of FIG. 1.

In the FIG. 2 embodiment, it is initially determined in a branching 10 for a wheel (the left front wheel 'VL' in this case), whether the maximum value of the reacceleration $a_{VL}$ reaches a limit value $a_G$ in a reacceleration phase following pressure reduction. In the embodiment of the present invention shown, the circuit is intended for use in a rear-wheel driven vehicle, for what reason the front wheels VL, VR are the wheels which are analyzed according to the method of the present invention.

When the maximum value of reacceleration $a_{VL}$ of the left front wheel VL is below the predetermined limit value $a_G$ and the maximum value of the filtered reacceleration $a_{FVL}$ of this wheel is below a limit value $a_{FG}$ which is predefined for the filtered acceleration, which is determined in a branching 11, step 12 will follow. When the question about the sufficient duration $T_F$ of the positive variation of the filtered acceleration is 'confirmed' in step 12, i.e., the duration $T_F$ exceeds a predetermined limit value $T_G$, the same sequence of interrogation will follow for the second non-driven-wheel, i.e., the front wheel VR.

The steps of decision 13, 14, and 15 entirely correspond to the explained steps 10 to 12. This is because the mentioned conditions must be fulfilled for both non-driven wheels in order to identify a low coefficient-of-friction situation or a criterion for such a situation (suspected low coefficient of friction) in program step 16. As a reaction to the identification of the low coefficient of friction, a permanent pressure reduction is performed in step 17 until the commencement of wheel reacceleration in the subsequent control phase, i.e. in the instability followed by reacceleration of the wheel. The interrogation procedure (shown in FIG. 2) will restart.

Thus, the method of the present invention comes into effect only if predetermined limit values on both non-driven wheels are maintained or exceeded. A limit value ranging between 2.5 g and 4 g, in a special embodiment a limit value of 3 g approximately, has been found to be suitable as the maximum value $a_{max}$ of wheel acceleration a. As the maximum value $a_{Fmax}$ of the filtered wheel acceleration $a_F$, a limit value ranging between 1.2 g and 2.5 g, i.e., between 1.5 g and 1.8 g in the special embodiment, is especially preferred. The minimum value should range between 50 milli-sec and 100 milli-sec for the interval of the positive variation of the filtered acceleration $a_F$ in this phase. This minimum value was set to roughly 80 milli-sec in the special embodiment.

In curves 'A' to 'D' in the FIG. 3 embodiment, there are plotted the speed variation $v_R$ of a non-driven front wheel, the associated wheel acceleration A, the associated filtered acceleration $a_F$, and the time recording, for example, by way of a correspondingly controlled counter or an integrator, in a situation where the method of the present invention takes effect on the control and improves the control.

The non-driven wheel which has a speed referred to as $v_R$ shows a locking tendency at the point of time $t_0$. Anti-lock control starts. The time variation of the wheel speed $V_R$, i.e., the deceleration and acceleration a, reaches a maximum value $a_{max}$ in the reacceleration phase at time $t_1$ (see FIG. 3B). The filtered wheel deceleration and reacceleration $a_F$ reaches the maximum value somewhat later, at the time $t_2$ (see FIG. 3C). Only the reacceleration after the first instability of the wheel is of interest in this respect. The duration of the positive variation of the filtered acceleration reaches or exceeds a time limit value $T_G$. In the example shown in the diagrams of FIG. 3, the maximum acceleration values $a_{max}$ and $a_{Fmax}$ are below the predetermined limit values $a_G$ or $a_{FG}$. The duration of the positive half wave T is in excess of the limit value $T_G$. Because the conditions for the two non-driven wheels are satisfied, it is concluded that a situation with a low coefficient of friction exists (as has already been explained with reference to FIG. 2). Consequently, an increased or even permanent pressure reduction is induced in the following instability phase which starts at time $t_4$ in the FIG. 3 embodiment.

The analysis according to the present invention ensures a particularly safe, quick and reliable identification of the present coefficient of friction and especially a low coefficient of friction. Thus, the identification of the low coefficient-of-friction situation is already possible by the wheel course in the first control phase by means of evaluation of the reacceleration of the non-driven wheels.

What is claimed is:

1. Method of improving the control behavior of an anti-lock brake system, wherein the rotational behavior of the vehicle wheels is measured and evaluated for determining slip, wheel deceleration wheel acceleration and other control quantities, in order to assess the instantaneous coefficient of friction between the wheels and the road surface and to generate braking pressure control signals, comprising the steps of:

A) analyzing a reacceleration of at least one non-driven wheel following a control-induced braking pressure reduction on said at least one non-driven wheel, and determining, generally concurrently, B) determining, and generating an affirmative signal, if a reacceleration of said at least one non-driven wheel is below a predefined limit value, C) determining, and generating an affirmative signal, if a maximum filtered acceleration of said at least one non-driven wheel is below a predefined limit value, D) determining, and generating an affirmative signal, if the duration of a positive portion of the maximum filtered acceleration exceeds a predetermined time interval, and E) reducing the braking pressure on said at least one non-driven wheel if affirmative signals are generated in steps B, C, and D.

2. Method as claimed in claim 1, further including the step of:

reducing the braking pressure by actuating a pressure reducing valve in an anti-lock system using pressure increase and pressure reduction pulses.

3. Method as claimed in claim 1, further including the step of setting the limit value of the maximum acceleration to a value in a range between 2.5 g and 4 g.

4. Method as claimed in claim 1, further comprising the step of presetting the limit value of the maximum filtered acceleration by a value ranging generally between 1.2 g and 2.5 g.

5. Method as claimed in claim 1, further comprising the step of presetting the limit value for the duration of the positive variation of the filtered wheel acceleration generally between 50 milli-sec and 100 milli-sec.

\* \* \* \* \*

UNITED STATES PATENT AND TRADEMARK OFFICE
CERTIFICATE OF CORRECTION

PATENT NO.     : 6,205,393 B1
DATED          : March 20, 2001
INVENTOR(S)    : Ivica Batistic Page 1 of 1

It is certified that error appears in the above-identified patent and that said Letters Patent is hereby corrected as shown below:

<u>Column 5,</u>
Line 14, change "slip, wheel deceleration wheel acceleration" to -- slip, the wheel deceleration and wheel acceleration --

Signed and Sealed this

Twenty-eighth Day of May, 2002

*Attest:*

*Attesting Officer*

JAMES E. ROGAN
*Director of the United States Patent and Trademark Office*